United States Patent
Hills et al.

[15] 3,665,000
[45] May 23, 1972

[54] TRICARBOXYSTARCH DERIVATIVES

[72] Inventors: William A. Hills, Trenton; Gert P. Volpp, Princeton, both of N.J.

[73] Assignee: FMC Corporation, New York, N.Y.

[22] Filed: Dec. 23, 1969

[21] Appl. No.: 887,759

[52] U.S. Cl. ..................260/233.3 R, 252/89, 260/212, 260/233.3 A, 260/233.5
[51] Int. Cl. ..................................................C13l 1/08
[58] Field of Search..............260/233.3 A, 233.3, 233.5, 260/231, 212

[56] References Cited

UNITED STATES PATENTS

| | | | |
|---|---|---|---|
| 2,472,590 | 6/1949 | Kenyon et al. | 260/209 |
| 2,557,473 | 6/1951 | Ryan | 252/8.5 |
| 2,894,945 | 7/1959 | Hofreiter et al. | 260/233.3 |
| 2,298,387 | 10/1942 | Kenyon et al. | 260/687 |

OTHER PUBLICATIONS

Whistler et al., Starch: Chemistry and Technology, Vol. 1, 1965, pages 469 to 478.

*Primary Examiner*—Donald E. Czaja
*Assistant Examiner*—M. I. Marquis
*Attorney*—Thomas B. Graham, Eugene G. Seems and Robert D. Jackson

[57] ABSTRACT

Tricarboxyl derivatives of starch and a process for their preparation which comprises directly oxidizing dialdehydestarch with dinitrogen tetroxide. The tricarboxyl derivatives function as polyelectrolyte builder materials and serve to enhance the cleaning capacity of conventional detergent compounds.

3 Claims, No Drawings

TRICARBOXYSTARCH DERIVATIVES

BACKGROUND OF THE INVENTION

Methods for oxidizing starches in order to elucidate specific starch structures or to modify starch structures for industrial purposes are well known to those skilled in the art. Thus, such oxidizing agents as hydrogen peroxide, halogens, periodic acid, hypochlorites, sodium perborates, ammonium persulfate, alkaline peroxides, alkaline permanganates, and the like have been utilized to convert aldehyde, primary alcohol, sec-alcohol and glycol groups to carboxyl and carbonyl groups in the starch molecule. However, these methods have been unable to achieve high levels of oxidation, i.e. oxidation of all three hydroxyl functions in the starch molecule to a near quantitative degree, while still retaining the basic structures of the starch molecule. Thus, substantial degradation of the starch polymer has accompanied these reactions thereby converting the starches to dextrines and other degradation products during the course of the reaction.

SUMMARY OF THE INVENTION

It is the primary object of this invention to prepare highly oxidized derivatives of starch by means of an efficient reaction procedure.

It is a further object to prepare the tricarboxystarch derivatives without causing substantial degradation of the starch polymer.

It is still a further object to prepare effective detergent formulations utilizing the tricarboxyl derivatives as detergent builders therein.

Various other objects and advantages of this invention will be apparent from the following description.

We have now found that novel oxidized, i.e. tricarboxyl, derivatives of starch characterized by having from about 2.2 to 3.0 carboxyl groups per six carbon unit may be prepared by the direct oxidation of dialdehydestarch with dinitrogen tetroxide. These unique oxidized starch derivatives are compounds in which a high percentage of the 2-,3-and 6-hydroxyl containing carbons of the starch molecule have been converted to carboxyl groups and, accordingly, they contain monomeric units corresponding to the formulae

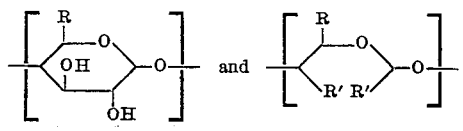

wherein R is selected from the group consisting of —COOH and —CH$_2$OH and R' is selected from the group consisting of —COOH and —CHO, it being required that the number of carboxyl groups range from about 2.2 to 3.0 per six carbon unit.

An inspection of the above formulae indicates that the products of this invention are, technically, no longer starches inasmuch as the basic anhydroglucose unit of the starch molecule has been disrupted in forming the carboxyl groups. Nevertheless, for purposes of this invention, the novel products disclosed herein will be referred to as "tricarboxystarch derivatives."

Furthermore, the unique process for preparing these starch derivatives accomplishes the oxidation reaction without causing substantial degradation of the starch polymer. It also allows for the ready isolation of the free carboxylic acid derivatives and their corresponding salts without the need for the elaborate and tedious purification procedures which were required heretofore.

We have also found that the tricarboxystarch derivatives exhibit excellent calcium sequestering and detergent builder characteristics and, accordingly, may be readily combined with a wide variety of surface active agents, i.e. detergents, and optional ingredients to prepare detergent formulations which exhibit superior laundering characteristics.

DESCRIPTION OF THE PREFERRED EMBODIMENTS

In general, the procedure for preparing the novel tricarboxystarch derivatives requires the presence of a dialdehydestarch which may either be selected from commercially available products or prepared, for example, by reacting a starch base with periodic acid or a periodate salt in order to cleave the 2,3—C—C— bond and convert the secondary hydroxyl groups to aldehyde groups. The dialdehydestarch is then reacted with dinitrogen tetroxide to convert almost all of the 2- and 3-aldehyde groups and the 6-hydroxymethyl groups to carboxyl groups. Representing the starch molecule by means of a representative anhydroglucose unit, the above described reaction mechanism proceeds as follows:

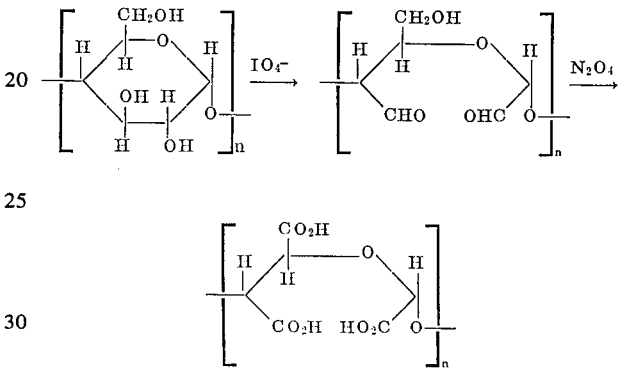

wherein n is indicative of the polymeric nature of the product.

The applicable starch base materials which may be used in preparing these novel starch derivatives may be either in a dispersed, i.e. gelatinized, or an intact granule form. They may be derived from any plant source including corn, potato, sweet potato, wheat, rice, sago, tapioca, waxy maize, sorghum, high amylose corn or the like. Also included are the conversion products derived from any of the latter based including, for example, dextrines prepared by the hydrolytic action of acid and/or heat; and fluidity or thin boiling starches prepared by enzyme conversion or by mild acid hydrolysis. In addition, the amylose and amylopectin fractions derived from any of the above noted starch bases may also be utilized. It is also possible to employ, in this process, any substituted ether or ester derivatives of starch or their amylose or amylopectin fractions, provided that such ester or ether derivatives still retain sufficient hydroxyl groups which are available for further reaction in the above described mechanism. Thus, the novel tricarboxystarch derivatives of this invention may be derived from any amyloaceous substances, whether untreated or chemically modified, which still retain the minimum number of free hydroxyl groups needed for participation in the derivatization reaction.

It should be noted that where amylose is the selected starch base and the oxidation reaction is taken to completion, the resulting product will exhibit a linear polymeric structure with monomeric units corresponding to the formula

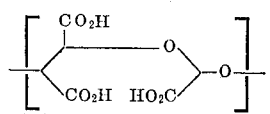

As previously indicated, the dialdehydestarch which is utilized may be either a commercially available material or may be prepared from the starch base by the practitioner. A typical preparative procedure involves slurrying the starch base in water, cooling the slurry to 0° to 5° C., adding sodium metaperiodate, adjusting the pH to a level of 5.0 with glacial acetic acid and allowing the reaction to proceed, under agitation, at 0° to 5° C. Further information with regard to methods for preparing dialdehydestarches may be found in the articles by Sloan et al., Industrial and Engineering Chemistry, 48, 1165 (1956), and Dvonch et al., Journal of the American Chemical Society, 74, 5522 (1952).

The resulting dialdehydestarch is then subjected to the direct oxidation process of this invention. Thus, the dialdehydestarch is added incrementally to a solution of dinitrogen tetroxide in an applicable inert organic solvent such as carbon tetrachloride, chloroform, methylene chloride or tetrachloroethane. The reaction proceeds at ambient temperatures for a period of about 12 to 24 hours whereupon additional dinitrogen tetroxide is charged into the system and the reaction continues for a additional period of about 24 to 48 hours. The excess dinitrogen tetroxide is removed by bubbling nitrogen gas through the system and observing for the disappearance of the red nitrous oxide fumes. Subsequent filtration, washing and drying isolates the tricarboxy starch derivative as a white solid.

With regard to proportions, the concentration of dinitrogen tetroxide used in dependent on the degree of oxidation in the derivative which is desired by the practitioner. For purposes of this invention, the molar ratio of dinitrogen tetroxide to dialdehydestarch ranges from about 1.5:1 to 10:1.

Although the direct oxidation procedure described hereinabove is the preferred method for preparing the novel tricarboxystarch derivatives of this invention, it should be noted that other techniques for accomplishing the desired objective may also be utilized. It is essential, however, that these procedures be conducted with great care in order to avoid the degradation of the starch molecule. It should be further recognized that the products resulting from these processes will, in general, be inferior with regard to levels of oxidation and performance characteristics to the products resulting from the direct oxidation procedure. Accordingly, any methods which provide products that do not measure up to the minimum standards specified herein will be viewed as inoperable for purposes of this invention. An example of such an alternative approach involves oxidizing the starch base to the dialdehyde form by means of a periodate reaction, treating the resulting dialdehydestarch with chlorous acid or a chlorite salt to form the 2,3-dicarboxystarch product, and thereafter, reacting the dicarboxy product with nitrogen dioxide in order to effect the specific oxidation of the 6-primary alcohol group. An additional procedure involves subjecting a 6-monocarboxystarch product to a periodate oxidation reaction in order to form 6-carboxystarch dialdehyde and, thereafter, reacting this product with chlorous acid or a chlorite salt in acetic acid to form the tricarboxy product.

It is to be noted that the tricarboxystarch derivatives of this invention contain from about 48.0 to 65.5 percent carboxyl groups, as based on the total weight of the resulting derivative. The latter range is indicative of a level of oxidation of from about 73 to 100 percent of the theoretical and is equivalent to a degree of substitution, i.e. number of carboxy groups per anhydroglucose unit of the starch molecule, ranging from about 2.2 to 3.0. It is in this previously unattained high level of oxidation that the oxidized starches of this invention exhibit their novelty.

The tricarboxystarch derivatives may be further converted into alkali metal and alkaline-earth metal salts as well as into alkyl esters. Methods for the preparation of such salts and esters are well known to those skilled in the art. For example, the sodium salt may be prepared by reacting an aqueous suspension of the starch derivative with sodium hydroxide and thereafter, precipitating the sodium salt with ethanol. Correspondingly, the methyl ester may be prepared by treating the tricarboxystarch with diazomethane.

As previously indicated, the highly oxidized starch products of this invention function as excellent polyelectrolyte detergent builders as a result of their ability to enhance the surface activity and improve the detersive efficiency of standard detergent formulations. Among the builder characteristics which are exhibited by these starch derivatives are included the ability to sequester calcium and magnesium ions, to extend the surfactant by making smaller mycels more effective, to function as a buffer around pH 8 to 10, to peptize soil and prevent its redeposition on the cleaned fabric, and to provide a residual effect in order to prevent precipitation of calcium and magnesium salts during the rinse cycle. In addition, these products are white, relatively inexpensive, non-toxic, stable to oxidizers in the dry state, non-corrosive, non-hygroscopic, innocuous to dyed fabrics, stable to hot alkaline detergent solutions, and stable during spray drying operations. The most attractive features of these materials are their relative low cost, their calcium and magnesium sequestering capacity, and their white color as well as the complete absence of nitrogen and phosphorus therein, thus avoiding the pollution problems which are encountered with the phosphate and nitrogen-containing builders currently being used.

The organic detergent compounds, i.e. surface active agents, which can be utilized in conjunction with the tricarboxystarch builders in the compositions of this invention are anionic, nonionic, ampholytic and zwitterionic synthetic detergents and mixtures thereof and are exemplified as follows:

a. Anionic synthetic non-soap detergents can be broadly described as the water-soluble salts, particularly the alkali metal salts, of organic sulfuric reaction products having in their molecular structure an alkyl radical containing from about eight to about 22 carbon atoms and a radical selected from the group consisting of sulfonic acid and sulfuric acid ester radicals. Important examples of the synthetic detergents are the sodium or potassium alkyl sulfates, sodium or potassium alkylbenzenesulfonates, in which the alkyl group contains from about 9 to about 15 carbon atoms (the alkyl radical can be a straight or branched aliphatic chain); sodium alkyl (glycerylsulfate) ether; sodium coconut oil fatty acid monoglyceride sulfates and sulfonates; sodium or potassium salts or sulfuric acid esters of the reaction product of one mole of a higher fatty alcohol (e.g. tallow or coconut oil alcohols) and about 1 to 6 moles of ethylene oxide, sodium or potassium salts of alkylphenol ethylene oxide ether sulfate with about 1 to about 10 units of ethylene oxide per molecule and in which the alkyl radicals contain from eight to about 12 carbon atoms; the reaction product of fatty acids esterified with isothionic acid and neutralized with sodium hydroxide, sodium or potassium salts of fatty acid amide of a methyl lauride, and sulfonated olefins.

b. Nonionic synthetic detergents: One class can be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. Another class has semi-polar characteristics. Preferred classes of nonionic synthetic detergents are as follows:

1. A class of nonionic synthetic detergents under the tradename of "Pluronic." These compounds are formed by condensing ethylene oxide with a hydrophobic base formed by the condensation of propylene oxide with propylene glycol;

2. The polyethylene oxide condensates of alkylphenols, e.g., the condensation products of alkylphenols having an alkyl group containing from about six to 12 carbon atoms in either a straight chain or branched chain configuration with ethylene oxide;

3. Those nonionic synthetic detergents derived from the condensation of ethylene oxide with the product resulting from the reaction of propylene oxide and ethylenediamine;

4. The condensation product of aliphatic alcohols having from eight to 22 carbon atoms, in either straight chain or branched chain configuration, with ethylene oxide;

5. The ammonia, monoethanol and diethanol amides of fatty acids having an acyl moiety of from about 8 to about 18 carbon atoms;

6. Long chain tertiary amine oxides such as dimethyldodecylamine oxide; cetyldimethylamine oxide; bis(2-hydroxyethyl)-dodecylamine oxide; bis(2-hydroxyethyl)-3-dodecoxy-1-hydroxy-propylamine oxide;

7. Long chain tertiary phosphine oxides such as dimethyldodecylphosphine oxide; diethyldodecylphosphine oxide; dimethyl-2-hydroxydodecylphosphine oxide;

8. Long chain sulfoxides such as dodecyl methyl sulfoxide; 3hydroxytridecyl methyl sulfoxide; 3-methoxytridecyl methyl sulfoxide; 3-hydroxy-4-dodecoxybutyl methyl sulfoxide.

c. Ampholytic synthetic detergents can be broadly described as derivatives of aliphatic secondary and tertiary amines, in which the aliphatic radical may be straight chain or branched and wherein one of the aliphatic substituents contains from about eight to 18 carbon atoms and one contains an anionic water solubilizing group, e.g., carboxy, sulfo, sulfato, phosphato, or phosphono. Examples of compounds falling within this definition are sodium 3-dodecylaminopropionate and sodium 3-dodecylaminopropanesulfonate.

d. Zwitterionic synthetic detergents can be broadly described as derivatives of aliphatic quaternary ammonium, phosphonium, and sulfonium compounds, in which the aliphatic radical may be straight chain or branched, and wherein one of the aliphatic substituents contains from about eight to 18 carbon atoms and one contains an anionic water solubilizing group, e.g. carboxy, sulfo, sulfato, phosphato, or phosphono. Examples of compounds falling within this definition are 3-(N,N-dimethyl-N-hexadecylammonio)propane-1-sulfonate and 3-(N,N-dimethyl-N-hexadecylammonio)-2-hydroxypropane-1-sulfonate.

In the novel detergent formulations of this invention, the weight ratio of surface active agent to tricarboxy starch builder ranges from about 3:1 to 1:10. These two ingredients generally represent about 45 to 70 percent of the total detergent formulation.

The formulations may also contain minor amounts of optional additives in order to modify certain properties thereof. Among such optional additives are included: Foam builders and stabilizers, antideposition agents such as sodium carboxymethylcellulose, corrosion inhibitors such as benzotriazole, optical brighteners, bactericides, perfumes, bleaches, enzymes, dyes, bluing, inert fillers, solvents and the like. These optional ingredients will generally be present in concentrations of about 30 percent, by weight.

It should be noted that the tricarboxystarch derivatives are used either in the form of their alkali metal salts or in acid-form together with a sufficient quantity of an alkali metal base, such as the carbonate or hydroxide, in order to neutralize the carboxyl group and adjust the pH level of the final detergent solution to within the desired 8–10 range.

The final detergent formulations may be a mixture of dry ingredients, a concentrated aqueous solution or a solid mix resulting from the drying thereof, or a combination of dry solids and dry ingredients as is common in the art.

The following examples will further illustrate the embodiment of this invention. In these examples, all parts given are by weight unless otherwise noted.

EXAMPLE I

This example illustrates the preparation of a typical tricarboxystarch derivative of this invention.

A reaction vessel filled with means for mechanical agitation was charged with 8.0 parts of corn starch and 400 parts of water at $80°$ C. The resulting suspension was cooled to $0°$ to $5°$ C. whereupon 16.1 parts of sodium metaperiodate were added thereto. The pH of the mixture was adjusted to a level of 5.0 by the addition of sufficient glacial acetic acid and the reaction allowed to proceed, under agitation, at a temperature of $0°$ to $5°$ C. for a period of 42 hours. The reaction mixture was centrifuged and the dialdehydestarch precipitate then washed with water to remove all traces of inorganic salts.

Thereafter, a reaction vessel fitted with a condenser, a drying tube and means for mechanical agitation was charged with a solution of 3.8 parts of dinitrogen tetroxide in 250 parts of dry carbon tetrachloride. The solution was vigorously agitated whereupon 4.0 parts of the above prepared dialdehydestarch was incrementally added thereto. The reaction was allowed to proceed at room temperature for a period of 22 hours. The mixture was then recharged with 3.8 parts of dinitrogen tetroxide and the reaction allowed to proceed for an additional 48 hours. The excess dinitrogen tetroxide was removed by bubbling nitrogen gas through the system until the red nitrous oxide fumes had substantially disappeared. The white solid product was then filtered, washed with water and dried.

Analysis of the resulting tricarboxystarch product indicated that it contained 55.07 percent, by weight, of free carboxyl groups. This figure represented a degree of oxidation of 84 percent of the theoretical and a degree of substitution of 2.52 carboxyl group per anhydroglucose unit. The product had a neutralization equivalent of 84.28. It was only slightly soluble in water but readily soluble in dilute sodium hydroxide solution.

It should be noted that the preparation of the dialdehydestarch as described hereinabove, may be avoided by utilizing, as the starting material, a commercially available dialdehydestarch product.

EXAMPLE II

This example illustrates the preparation of the trisodium salt of the tricarboxystarch derivative prepared in Example I, hereinabove.

A suspension of 5.0 parts of the tricarboxystarch derivative in 10 parts of water was titrated with a 10 percent, by weight, solution of sodium hydroxide until the solids completely dissolved. The pH level of the system was then adjusted to 10.0 with additional sodium hydroxide and the solid product precipitated with ethanol. The gummy solid which was recovered, was triturated with 80 percent aqueous ethanol whereupon the white powdered trisodium salt product was recovered.

EXAMPLE III

A number of additional tricarboxystarch derivatives were prepared according to the general procedures set forth in Example I, hereinabove. In each instance, the starch reactant was a commercial dialdehyde corn starch sold under the trademark "SUMSTAR 190." The resulting derivatives are presented in the following table:

| Derivative | % Oxidation | Neutralization Equivalent |
| --- | --- | --- |
| III–1 | > 90 | 84.97 |
| III–2 | > 90 | 85.47 |
| III–3 | > 90 | 84.21 |
| III–4 | > 90 | 82.99 |
| III–5 | > 90 | 84.41 |
| III–6[1] | 100 | 66.91 |

[1] oxidation reaction time of 118 hours

It should be noted that comparable tricarboxystarch derivatives may be prepared by utilizing, in the procedure, any of the starch bases previously listed.

EXAMPLE IV

This example illustrates the sequestering capacity of the tricarboxystarch derivatives of this invention.

Inasmuch as the ability to sequester calcium ions is a critical feature of an effective detergent builder, the trisodium salts of the tricarboxystarch derivatives of this invention, as prepared in Examples II and III, were subjected to the following test procedure in order to determine their sequestering capacity. Thus, an aqueous solution of the trisodium salt sample was titrated potentiometrically with a standardized calcium nitrate solution at a pH level of 10.0 and a temperature of 25° C. using a divalent cation activity electrode as the indicator electrode.

The results of this determination are presented in the following table:

| Builder (Example No.)[1] | Ca$^{++}$Seq. (g./100 g.) |
|---|---|
| III-1 | 16.10 |
| III-2 | 16.23 |
| III-3 | 16.66 |
| III-4 | 16.70 |
| III-5 | 16.47 |
| III-6 | 18.23[2] |

[1]Trisodium salts
[2]Mg$^+$A?sequestration—10.25 g./100 g.

The results indicate the ability of these tricarboxystarch derivatives to effectively sequester calcium ions. The results are especially noteworthy when compared with the 10.90 g./100 g. sequestering value for sodium tripolyphosphate, the standard in the builder field.

EXAMPLE V

This example illustrates typical detergent formulations of this invention as well as the excellent laundering properties exhibited by these products.

The following detergent formulation was utilized in this example:

| | Percent by Weight |
|---|---|
| Sodium linear-alkylarenesulfonate | 20.0 |
| Builder | 25.0 to 50.0 |
| Sodium metasilicate 5-hydrate | 12.0 |
| Sodium carboxymethylcellulose | 0.5 |
| Sodium sulfate | Balance |

A variety of builders were respectively substituted into the detergent formulation. In each instance, the formulation was prepared by merely blending the various ingredients. In order to determine the performance characteristics of the resulting detergent formulations, they were subjected to the following test procedure:

DETERGENCY TEST

A full description of this detergency test may be found in the article by Spangler et al., Journal of the American Oil Chemists Society, 42, 723 (1965). This test indicates the power of the particular detergent formulation to remove soil by a colloidal chemical process.

The test is conducted in a Terg-O-Tometer utilizing fabrics which have been soiled with a combination of airborne particulate matter and synthetic sebum. Three soil-wash cycles are conducted on each fabric utilizing the following test conditions: water hardness of 150 ppm and 300 ppm, respectively, with a Ca/Mg ion ratio of 1.5; detergent formulation concentration of 0.15 percent; temperature of 120° F.; pH level of 9.5; washing time of 10 minutes; and rinsing time of 2 minutes.

Reflectance readings on the washed swatches are then taken from a color difference meter. The results are expressed in terms of "percent reflectance" with the arbitrary standard of "100 percent reflectance" being established for the reflectance value obtained on a cotton swatch which had been washed with the standard detergent formulation containing 50 percent sodium tripolyphosphate builder in water of 150 ppm hardness.

The various builders which were utilized and the results of the tests on the formulated detergents are presented below.

| | | | Detergency — % of Standard | | | |
|---|---|---|---|---|---|---|
| builder | %, by wt., of builder | Water hardness (p.p.m.) | cotton | 50:50 dacron-cotton | 65:35 dacron-cotton | nylon |
| Sodium Tri-polyphosphate | 50 | 150 | 100 | 90 | — | 94 |
| Sodium Tri-polyphosphate | 50 | 300 | 79 | 68 | — | 50 |
| Trisodium Salt of Example III-5 | 25 | 150 | 98 | 78 | 77 | 77 |
| Trisodium Salt of Example III-6 | 50 | 300 | 93 | 79 | 77 | 77 |

The results presented hereinabove clearly indicate the effective laundering characteristics exhibited by detergent formulations containing tricarboxystarch builders.

It should be noted that comparable performance characteristics may be obtained by replacing the sodium linear alkylarenesulfonate in the above detergent formulation with any of the other surface active agents previously listed.

Summarizing, it is seen that this invention provides for the preparation of highly oxidized starch derivatives as well as for the use of these products as builders in detergent formulations.

Variations may be made in proportions, procedures and materials without departing from the scope of the invention as defined by the following claims.

What is claimed is:

1. A tricarboxy oxidized starch derivative containing from 2.2 to 3.0 carboxyl groups per monomeric six carbon unit of the derivative and the alkali metal salts thereof, and containing from 48.0 to 65.5 percent carboxyl groups based on the total weight of the derivative.

2. The oxidized starch derivative of claim 1, wherein said monomeric six carbon units correspond to the formulae

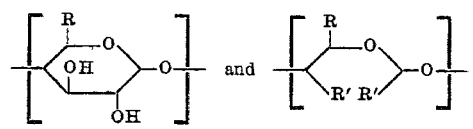

wherein R is selected from the group consisting of —COOH and —CH$_2$OH, and R' is selected from the group consisting of —COOH and —CHO.

3. The oxidized starch derivative of claim 2, wherein said monomeric six carbon unit corresponds to the formula

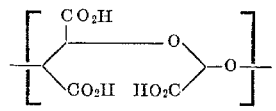

* * * * *